United States Patent [19]

Boudouris

[11] 4,253,749

[45] Mar. 3, 1981

[54] ELECTRONIC THEATER PROJECTOR

[76] Inventor: Angelo Boudouris, 5856 Highlandview Dr., Sylvania, Ohio 43560

[21] Appl. No.: 77,937

[22] Filed: Sep. 24, 1979

[51] Int. Cl.³ .............................................. G03B 1/24
[52] U.S. Cl. ..................... 352/187; 352/228
[58] Field of Search .............. 352/180, 184, 187, 166, 352/221, 228

[56] References Cited

U.S. PATENT DOCUMENTS

| | | | |
|---|---|---|---|
| 3,218,115 | 11/1965 | Barocela | 352/221 |
| 3,408,144 | 10/1968 | Cowan | 352/184 |
| 3,565,521 | 2/1971 | Butler et al. | 352/180 |
| 3,730,616 | 5/1973 | Fliesser | 352/166 |
| 3,937,378 | 2/1976 | Kopernicky | 352/184 |
| 3,998,533 | 12/1976 | Chamberlin | 352/184 |
| 4,022,525 | 5/1977 | Boudouris | 352/180 |
| 4,150,886 | 4/1979 | Merkel et al. | 352/180 |

*Primary Examiner*—Monroe H. Hayes
*Attorney, Agent, or Firm*—Oliver E. Todd, Jr.

[57] ABSTRACT

An improved electronic film transport is disclosed for advancing motion picture film past a light gate in a motion picture projector. The light gate includes a transparent plate which imparts a desired shape to the film and, preferably, one or more indexing pins which align the film with the plate. A sprocket is driven to advance the film to the light gate, causing a loop to form in the film and the film to move clear of the plate and indexing pins. A second sprocket then is driven to advance the film from the light gate. When the film advances one frame, it is again in contact with the plate and the indexing pin and the newly indexed frame is projected.

3 Claims, 6 Drawing Figures

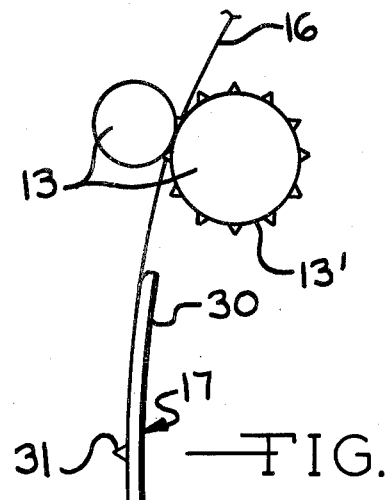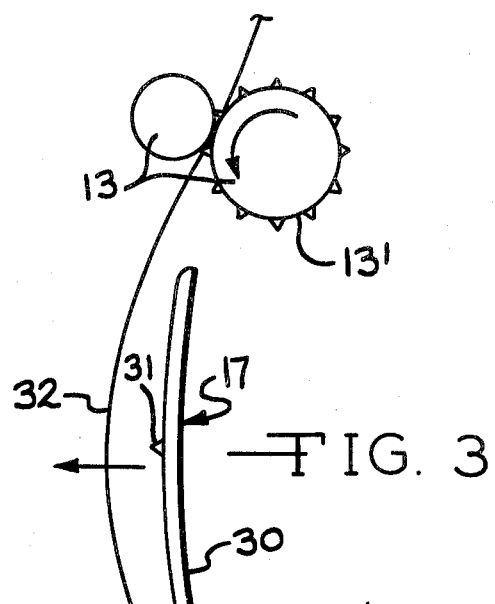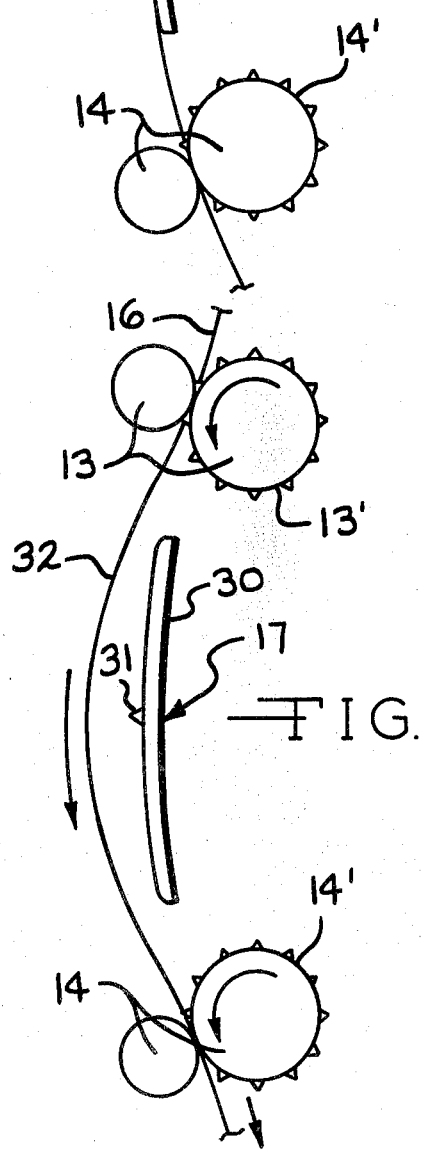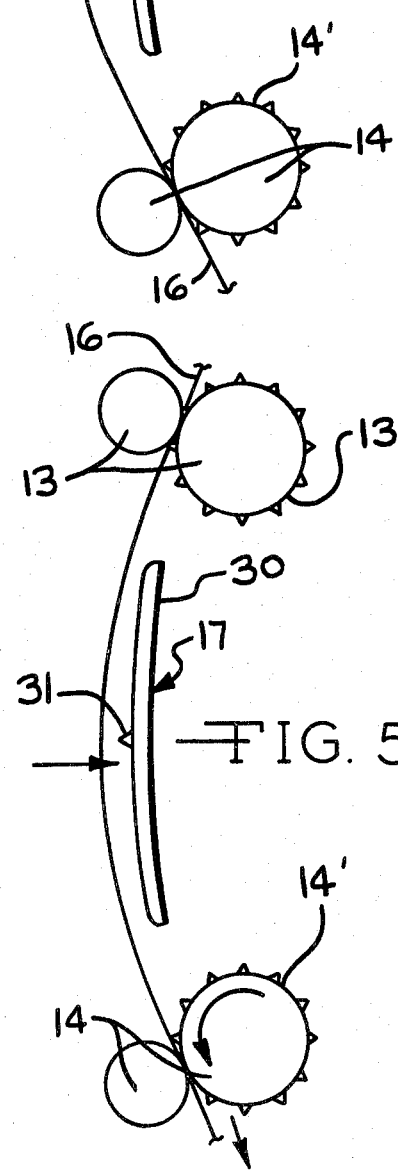

ELECTRONIC THEATER PROJECTOR

BACKGROUND OF THE INVENTION

This invention relates to motion picture projectors and more particularly to an improved electronic transport system for intermittently advancing film through a light gate in a motion picture projector.

Film projectors used in commercial motion picture theaters typically comprise a high intensity light source, film supply and take-up reels and a drive system therefor, and a projection head including a light gate through which the film passes, a transport for intermittently advancing the film through the light gate one frame at a time, a shutter and a lense system. The transport in the projection head often comprises a single motor which drives both the shutter and a Geneva mechanism which periodically rotates a sprocket through a predetermined increment to advance the film through the gate. The Geneva mechanism is synchronized with the shutter through a gear drive such that the sprocket is rotated by an amount necessary to advance the film through the gate by one frame each time the shutter interupts the projected picture. While a picture is projected, the Geneva mechanism inhibits movement of the sprocket to prevent any movement of the film in the gate.

Geneva mechanisms of a precision necessary for commercial motion picture projectors are quite expensive because of tight tolerance requirements. The mechanism must accurately advance the film in the gate to maintain a constant film alignment in the gate for each successive frame. If there is even a slight variation in the alignment of successive frames in the light gate, the projected image will jump or jitter. When the image is projected on a large screen, such jitter is extremely annoying to the viewer, and particulary to viewers seated nearest the screen.

My U.S. Pat. No. 4,022,525 is directed to an electronically controlled servomotor for intermittently advancing motion picture films through a light gate in a projection head and for precisely indexing each successive frame with the light gate. The film is incrementally advanced through the projection head by a servomotor system which is controlled in synchronism with the position of a shutter. The servomotor is driven to advance the film through the light gate by one frame when the shutter is in a position blocking the projected picture. The servomotor drive has several advantages over a Geneva mechanism. For example, the servomotor may be operated on an intermittent basis for advancing the film through the light gate one frame at a time or it may be driven on a continuous basis for rapidly moving the film forward or backward through the light gate, for example, to rapidly rewind the film back through the projection to automate the projector system. This is not possible with a transport using a Geneva mechanism since the Geneva mechanism moves the film on an intermittent basis both forward and backward and is limited in its maximum operating speed.

The light gate through which the film is intermittently advanced is positioned between a high intensity light source and a projection lense system. One purpose of the light gate is to hold a film frame either flat or with a predetermined curvature as the frame is being projected onto a screen. The light gate may be designed to impart a small curvature to the film frame in order to provide a better focus when the frame is projected on to a curved screen. In order to hold the film flat or with a predetermined curvature, edges of the film are normally clamped between spring biased guides. However, the spring biased guides may eventually cause the edges of the film to wear, thereby limiting the life of the film. For larger format films, such as 70 millimeter films, clamping the edges of the film in the light gate may be insufficient to provide a desired flatness or curvature to the film frame during projection. This is further complicated by the fact that heat from the light source heats the film in a non-uniform manner and tends to warp the film during projection of a picture. In one commercially available large format projector, the film is pressed or held against a glass plate in the light gate during projection of a picture. The glass plate is shaped to provide a desired flatness or curvature to the film frame during projection. When the film is to be advanced, a compressed air jet forms a loop into the film and this loop is then rolled down one frame past the glass plate in the light gate. However, this system has proved extremely expensive to construct.

SUMMARY OF THE INVENTION

According to my present invention, an improved film projector is provided with an electronically operated intermittent drive for advancing the film past a light gate. The projector is suitable for either standard format films or large format films. The light gate includes a transparent glass plate having a predetermined flatness or curvature and an indexing pin which engages a sprocket hole in the film for aligning each successive film frame with the projector optics. Two electronically controlled servomotors independently drive sprockets located above and below the glass plate in the light gate. Film moves, for example, from a supply reel through a constantly driven sprocket to a first film loop and thence through one intermittently driven sprocket, over the glass plate in the light gate to the second intermittently driven sprocket and through a second loop and constantly driven sprocket to a take-up reel. While a picture frame is projected, the two intermittently driven sprockets tension the film against the glass plate in the light gate. After the shutter interrupts the projected picture, the first sprocket begins to advance the film from the loop nearest the supply reel while the second sprocket remains stationary. This causes the film to form a loop, pushing the film away from the indexing pin and the glass plate in the light gate. The first sprocket is driven to advance the film exactly one frame. Either after the film is advanced one frame and the first sprocket has stopped or at least after the film is advanced clear of the indexing pin, the second sprocket is driven, also to advance the film by one frame. As the second sprocket approaches its end of travel, the first sprocket will have already stopped and the film will be pulled into contact with the indexing pin and glass plate in the light gate. Through this arrangement, the film is maintained in tension against the glass plate for precise control over its shape in the light gate, even when a large format film is used and the film is heated at a non-uniform rate. Furthermore, since the film is moved perpendicularly away from and against the glass plate in the light gate, it is not subject to abrasive wear as in prior art light gates in which edges of the film are pulled between spring biased guides.

Accordingly, it is an object of the invention to provide an improved transport for intermittently moving motion picture film past a light gate.

Another object of the invention is to provide an improved film transport suitable for use with wide format motion picture film in which the film is not subject to abrasive wear as it is advanced through the light gate.

Other objects and advantages of the invention will become apparent from the following detailed description, with reference being made to the accompanying drawings.

BRIEF DESCRIPTION OF THE DRAWINGS

FIG. 2 is a fragmentary diagramatic side view showing a glass light gate plate and the adjacent drive sprockets for intermittently advancing film with a section of motion picture film in contact with the plate;

FIG. 3 is a fragmentary diagramatic side view, similar to FIG. 2, and showing a first of the drive sprockets rotating to impart a loop in the film to space the film from the light gate plate;

FIG. 4 is a fragmentary diagramatic side view, similar to FIG. 3, and showing both the first and second sprockets rotating to advance the film through the light gate by a frame;

FIG. 5 is a fragmentary diagramatic side view, similar to FIG. 3, and showing the first of the sprockets stopped and the second sprocket driven to move a new picture frame into contact with the light gate plate and indexing pin;

DESCRIPTION OF THE PREFERRED EMBODIMENT

Figure 1:
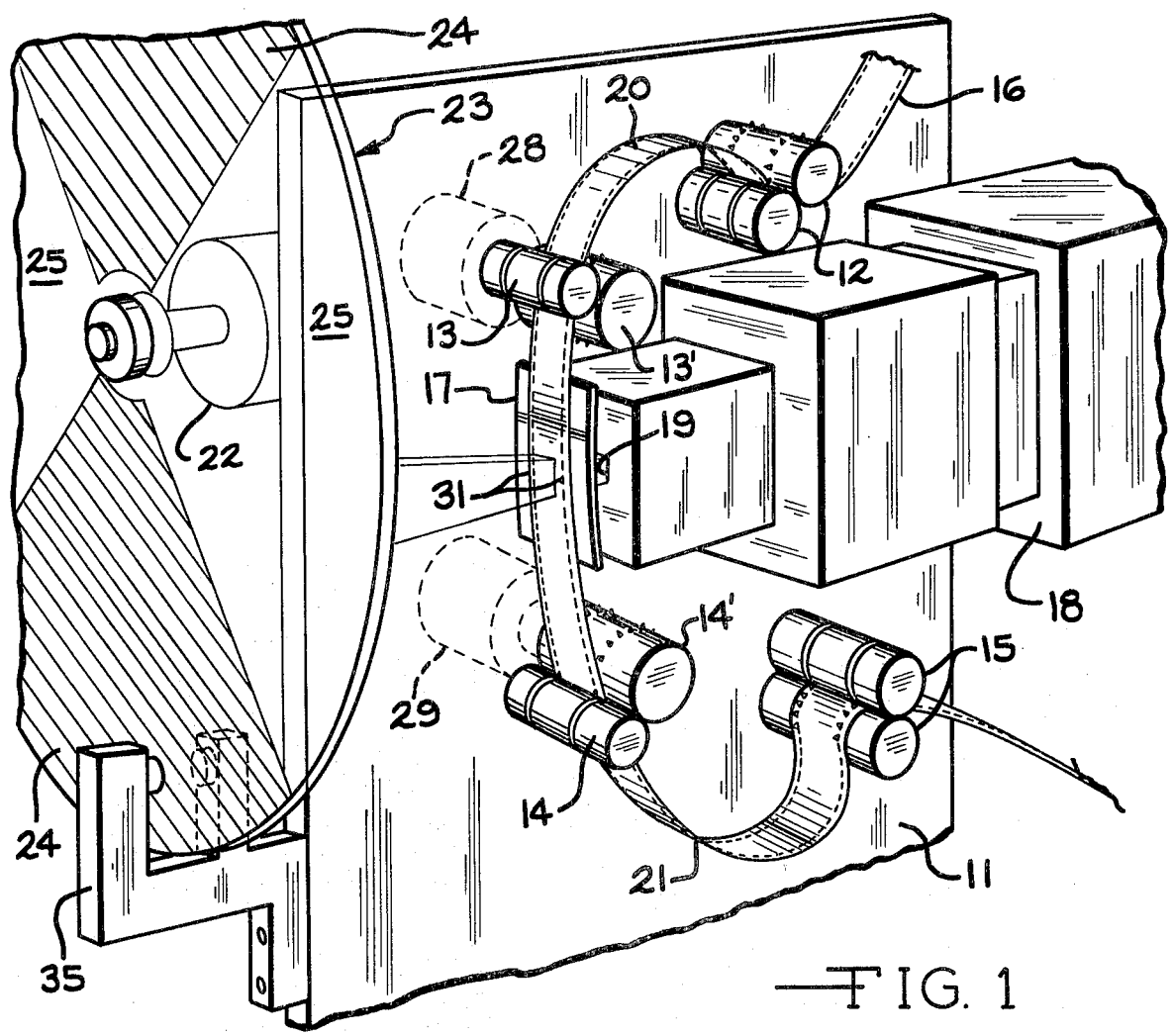
FIG. 1 is a fragmentary perspective view of a portion of a projection head for a motion picture projector which is exemplary of the present invention.

Turning now to the drawings and particularly to FIG. 1 and fragmentary portion of a projection head 10 exemplifying the present invention as shown. The projection head fragment 10 includes a bulkhead 11 which forms an internal partition within a conventional projection head housing (not shown). Mounted on the bulkhead 11 are four pairs of driven sprockets 12, 13, 14 and 15 for moving film 16 continuously through the projection head 10 and at the same time intermittently through a light gate 17. Light from an external light source 18 is directed towards an aperture 19 in the light gate 16. The light gate aperture 19 has a predetermined internal demension for framing the projected picture.

The film 16 is pulled at a constant speed from a suitable film supply reel or coil (not shown) through the pair or sprockets 12 to a loop 20. The pair of sprockets 13 intermittently advance the film from the loop 20 to the light gate 17 and the pair of sprockets 14 intermittently pull the film from the light gate 17 and feed the film to a second loop 21. From the loop 21, the pair of sprockets 15 are driven at a constant speed to deliver the film 16 to a conventional film take-up reel or coil (not shown). The pairs of sprockets 12 and 15 are driven at a constant speed equal to the average speed of the intermittently driven sprockets 13 and 14 such that, over a period of time, the size of the loops 20 and 21 remain substantially constant. The pairs of sprockets 12 and 15 may be driven from a constant speed motor, such as motor 22 which also drives a shutter 23. Drive connections between the motor 22 and the sprockets 12 and 15 are of a conventional design and, for simplicity, are not shown on the drawings.

The shutter 23 is illustrated as consisting of one or more opaque areas 24 (two shown) separated by transparent areas 25. The shutter 23 may consist of a transparent disc having an opaque foil or coating attached thereto to form the opaque areas 24, or it may consist of a blade forming the opaque areas 24 with openings forming the transparent areas 25. The shutter 23 is mounted on a shaft on the motor 22 and is rotated to periodically interrupt the projected picture. In the exemplary projection head shown in FIG. 1, the shutter 23 is positioned between the light gate 17 and a conventional projection lense system (not shown). Or, the shutter 23 may by positioned between the light source 18 and the light gate 17. This arrangement may be preferable since radiant heat energy to the film 16 will be interrupted whenever the projected picture is interrupted by the shutter. The motor 22 drives the shutter 23 at a constant speed such that the projected picture is interrupted each time the film 16 is to be advanced through the light gate 17. If, for example, the film 16 is advanced at a rate of 24 frames per second, then the shutter 23 is rotated at a rate of 12 revolutions per second or 720 revolutions per minute since the shutter 23 has two opaque areas 24.

A servomotor 28 is connected for direct drive of one sprocket 13' of the pair of sprockets 13 and a servomotor 29 is mounted for directly driving one sprocket 14' of the pair of driven sprocket 14. The servomotors 28 and 29 are controlled for intermittently advancing the film 16 past the light gate 17 during the showing of a film and for continuously moving the film 16 past the light gate 17 during a fast forward or a rewind operation. The light gate 17 includes a transparent plate 30 which is shaped to impart a desired flatness or curvature to a film frame during projection. The transparent plate 30 should be of a hard clear material, such as sapphire glass, so as to be highly resistant to scratching. Two indexing pins 31 are located for engaging sprocket tooth holes on opposite sides of the film 16 when the film 16 is tensioned against the plate 30. The indexing pins 31 function to properly align each successive film frame in the light gate 17 so as to prevent jitter in the projected motion picture.

The method by which the film is advanced past the light gate 17 is illustrated in FIGS. 2-5. FIG. 2 shows the film 16 in a position abutting the glass plate 30 while a picture frame is projected onto a screen (not shown). After the shutter interrupts the projected picture, the servomotor 28 is energized to drive the sprocket 13'. As the sprocket 13' rotates, the film 16 forms a loop 32 between the sprocket pair 13 and the sprocket pair 14. As the loop 32 enlarges, it moves away from the glass plate 30 and the film moves clear of the indexing pins 31, as illustrated in FIG. 3. After the film loop 32 is sufficiently large and the film 16 is clear of the indexing pins 31, the servomotor 29 is energized to begin driving the sprocket 14' of the sprocket pair 14. Driving of the sprocket 14' may be instigated immediately upon the film loop 32 clearing the indexing pins 31, or it may be instigated after the sprocket 13' has completed advancing one frame of the film to the light gate 17. FIG. 4 illustrates the simultaneous driving of the sprockets 13' and 14' to advance the film 16 through the light gate 17. After one frame is advanced by the sprocket 13', the servomotor 28 is stopped and rigidly holds the sprocket 13' from further movement. Driving of the sprocket 14' continues, as illustrated in FIG. 5, to move the film loop 32 towards and ultimately into contact with the glass plate 30 and the indexing pins 31. When the film has advanced through the sprocket pair 14 by one frame, the film 16 will again be in contact with the plate 30, as illustrated in FIG. 2, and the servomotor 29 is stopped to rigidly hold the position of the sprocket 14' with the film tensioned against the glass plate 30. It should be noted that if the servomotors 28 and 29 are controlled with sufficient accuracy, the indexing pins 31 may be eliminated.

At times, it is desirable to advance the film forward or backward through the projection head 10 at a continuous fast speed, for example, to skip a feature on the film or for rapid rewinding the film in an automated projection system. This may be accomplished by driving one of the sprockets 13' or 14' to form the film loop 32 so that the film 16 is clear of the indexing pins 31. Then, the two servomotors 28 and 29 are simultaneously operated at the same speed to rotate the sprockets 13' and 14' together. After the film is either advanced or rewound to a desired point, one of the sprockets 13' or 14' is stopped and the film is moved into contact with the plate 30 as illustrated in FIG. 2, and the projection of a picture may be reinitiated.

Figure 6:
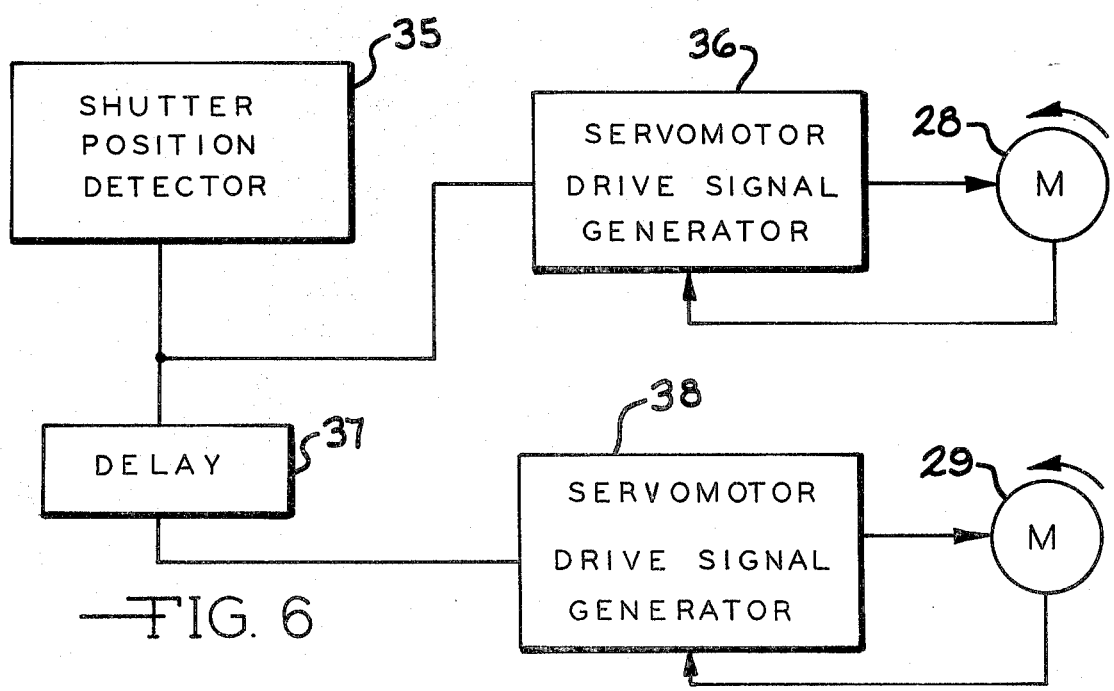
FIG. 6 is a block diagram showing an exemplary servomotor control circuits for operating the sprocket drive motors to advance the film through the film gate by single.

Turning now to FIGS. 1 and 6, the manner in which the servomotors 28 and 29 are driven is illustrated. A sensor 35 is illustrated mounted on the bulkhead 11 to sense the position of the shutter 23. The sensor 35 may comprise any desired type of shutter position detector, such as a proximity switch or a light source and a light detector positioned on opposite sides of the shutter. The purpose of the sensor or detector 35 is to sense when the shutter 23 is in a position interrupting the projected picture so that the film 16 may be advanced. The sensor or positioned detector 35 generates an output signal which triggers a servomotor drive signal generator 36. The servomotor drive signal generator 36 may be of a type known in the prior art, such as is disclosed in my U.S. Pat. No. 4,022,525, the disclosure of which is incorporated herein. The servomotor drive signal generator 36 generates a signal for driving the servomotor 28 through a predetermined increment for advancing the film 16 by one frame. The signal applied from the servomotor drive signal generator 36 to the servomotor 28 may, for example, have a generally trapezoidal shape for initially accelerating the sprocket 13' from a stopped position to a maximum rotational speed, maintaining the rotational speed as the film is advanced and finally slowing down the sprocket 13' to position the film 16 in proper alignment with the light gate 17.

In the circuit illustrated in FIG. 6, the output from the shutter position detector or sensor 35 also is applied through a time delay circuit 37 to a second servomotor drive signal generator 38 which is similar to the signal generator 36. The generator 38 developes a signal for driving the servomotor 29 in the same direction as the servomotor 28 is driven. The time delay circuit 37 delays the start of the servomotor 29 after the servomotor 28 is started to allow the formation of the loop 32 in the film 16 so that the film 16 is clear of the plate 30 and the indexing pin 31. Of course, it should be appreciated that the time delay circuit 37 may be omitted and that two separate shutter position detectors may be provided in a spaced apart relationship for generating two signals which are separated by a short time interval. It also should be appreciated that other apparent methods may be used for generating the signal for starting the servomotor drive signal generators 36 and 38 a short time interval apart. For example, the signals may be generated by a proximity switch which detects the position of the shutter or some other element within the projector which is driven in synchronism with the shutter. Or, a switch may be connected to a cam driven in synchronism with the shutter. The primary considerations are that the servomotor drive signal generators 36 and 38 must be driven to advance the film 16 by one frame during the time interval that the shutter interrupts the projected picture and that the film 16 must be supplied to the light gate 17 to form the loop 32 before it is advanced away from the light gate 17.

It will be appreciated that various modifications and changes may be made in the above described preferred embodiment of my electronic theater projector without departing from the spirit and the scope of the following claims.

I claim:

1. A film transport for motion picture projector comprising a light gate including surface means for imparting a predetermined curvature to at least one picture frame on the film, film supply means for continuously delivering film at a predetermined speed, first controlled sprocket means for advancing such delivered film to said light gate, film take-up means for continuously receiving film, second controlled sprocket means for advancing film from said light gate to said take-up means, first means for controlling said first sprocket means to advance said film to said light gate, said advancing film moving clear of said surface means, and second means for controlling said second sprocket means to advance said film away from said light gate after said film is advanced by said first sprocket means at least clear of said surface means.

2. A film transport for a motion picture projector, as set forth in claim 1, wherein said means for controlling said first sprocket means causes said first sprocket means to advance one picture frame to said light gate, and wherein said means for controlling said second sprocket means causes said second sprocket means to advance said film by one picture frame away from said light gate.

3. A film transport for a motion picture projector, as set forth in claims 1 or 2, and wherein said light gate further includes indexing means for aligning the film with said surface means, and wherein such advancing film moves clear of both said surface means and said indexing means.

* * * * *